Feb. 15, 1966  N. G. LOZINS  3,235,734
PHOTOELECTRIC SPACE VELOCITY METER UTILIZING STAR
ABERRATION DUE TO VELOCITY CHANGE
Filed Dec. 15, 1961  4 Sheets-Sheet 1

*INVENTOR.*
NEAL G. LOZINS
BY Roger W. Jensen
ATTORNEY.

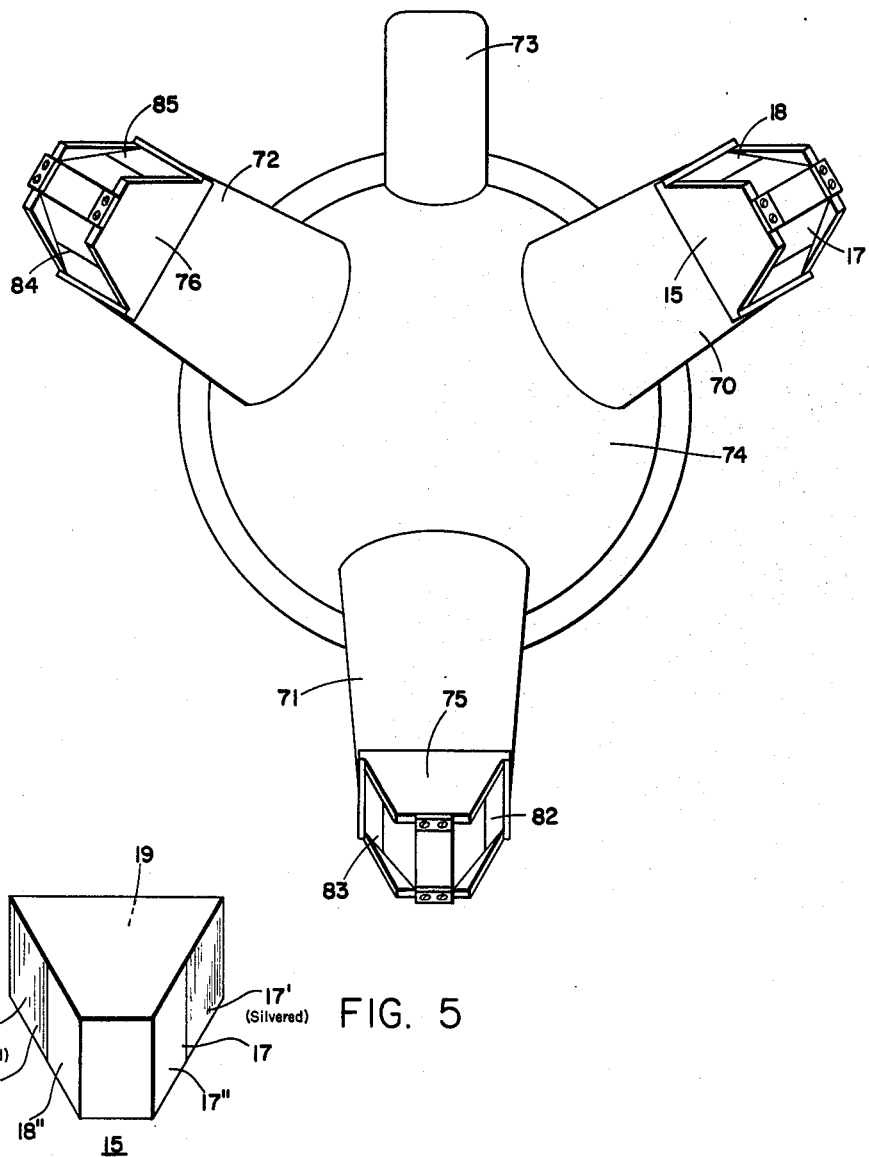
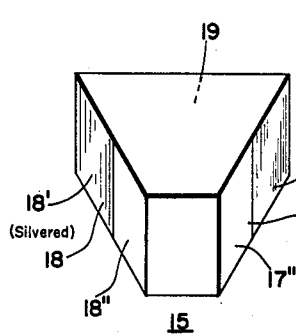
FIG. 5
FIG. 7
INVENTOR.
NEAL G. LOZINS
ATTORNEY.

United States Patent Office 3,235,734
Patented Feb. 15, 1966

3,235,734
PHOTOELECTRIC SPACE VELOCITY METER UTILIZING STAR ABERRATION DUE TO VELOCITY CHANGE
Neal G. Lozins, Largo, Fla., assignor to Honeywell Inc., a corporation of Delaware
Filed Dec. 15, 1961, Ser. No. 159,532
10 Claims. (Cl. 250—203)

This invention relates to a space velocity meter and more particularly to a device utilizing the aberration of starlight to determine the velocity of a vehicle in space.

Star aberration may be defined as an apparent motion of the stars due to the relationship between the rate of propagation of light and the rate of motion of the observer. To explain more fully, an observer in space while at rest would note that a star had a particular position in relation to him, and other stars; however, if the observer moved along a line perpendicular to the line of sight of the star he would note that the star apparently moved slightly in the same direction that he was moving. If the observer were looking at the star through a telescope or some sighting device he would note that at rest his telescope was pointed in a particular direction. However, as he began to move he would have to point his telescope slightly in the direction in which he was moving to keep the star in sight. The higher his velocity became the further he would have to point the telescope in the direction in which he was moving in order to maintain a sight on the star. Thus, it can be seen that the angle between the at rest position of the telescope sighted on the star and the position to which the telescope must be moved to remain sighted on the star while the observer is in motion is directly proportional to the velocity of the observer.

It would however be impractical for an observer in space to utilize one telescope and one star to determine his velocity. Even the slightest deviation in the telescope line of sight or change in craft attitude would cause a comparatively large change in the reference to which the observer's telescope was mounted and, therefore, cause a large change in the apparent angle of the star. Thus, to utilize one telescope and one star to obtain the observer's velocity in space would require an elaborate and extremely accurate direction finding system.

In prior art devices a pair of telescopes are utilized to observe a pair of stars. By observing the angle the pair of stars make, with the observer at the apex of the angle, at a first time and by observing the angle at a second time the change of velocity of the observer can be determined from the change in the angle. It should be noted that initial velocity cannot be determined from the change of angle. The change of angle simply indicates the change of velocity which can be vectorially added to the initial velocity to give the total velocity with respect to some coordinate frame of reference. The angle between the stars is determined directly from the angle between the telescopes, or in some more sophisticated systems, the angle between the stars is determined from the angle at which the light enters each of the telescopes. In these prior art devices if a temperature or acceleration change affects one telescope but not the other or if one sensor changes slightly there can be a large error in the measured readout of the apparatus. Also, in the initial alignment of the prior art devices great care must be taken in positioning the two separate telescopes in relation to each other and in relation to the stars it is desired to observe or the star light will not impinge upon the photo senors properly, and the apparatus will then be useless for determining the velocity.

In the present apparatus a single telescope is utilized to discern a pair of widely separated stars simultaneously. The light from the pair of stars travels through the telescope and a system of mirrors to a rotating prism or reflector. This rotating prism may be what is known in the art as a dove prism, and is used to sweep the star images across the detecting means. Many different arrangements of mirrors or prisms can be devised for this purpose. The preferred embodiment of the present invention utilizes as a detecting means an image converter tube such as a vidicon or image orthicon tube which are types of television camera tubes. The glass face plate of the vidicon tube has a conducting layer of metallic film deposited upon it which is so thin that it is transparent. A layer of photoconductive material is then deposited upon the back of the conductive layer. This photoconductive material is a semi-conductive material which is characterized by a resistance that decreases upon exposure to light. As the rotating dove prism sweeps the star images across the face of the vidicon tube a charge pattern in the form of two parallel lines is set up. This pattern can be read out by scanning with an electron beam from the electron gun of the vidicon tube.

The distance between the two parallel lines is measured by scanning at a constant rate. As the scanning beam sweeps across the two lines, two pulses are generated for each scan. The time interval between pulses is then proportional to the distance between the lines. During each TV frame this scan is repeated many times, and the advantages inherent in averaging techniques are readily obtained.

At the time a space vehicle completes its boost and orbital injection maneuvers, its velocity with respect to the heliocentric reference frame is accurately known. However, the natural forces which act upon this vehicle during the unpowered portions of its transfer orbit are too weak to be detected by conventional or present state of art devices. Therefore, changes in velocity cannot be detected.

At the termination of the final injection thrust maneuver the subject apparatus is read out in the manner as described. Velocity, being known at this time, is correlated with the readout of the apparatus, and both are recorded in the computer memory. All subsequent measurements are compared with this calibration measurement.

Three of the above described devices can be incorporated in one system to simultaneously obtain projections of the velocity change of the craft on three planes and by means of the computer, the velocity in the desired direction can be calculated. This simply means that three telescopes, each discerning a pair of stars, would transmit light, or star images, to a single rotating reflector or prism which would alternately sweep the light from each telescope across the face of a single vidicon tube. Thus, a comparatively inexpensive device can be constructed.

It should also be noted that since the star image from each star in a pair of stars traverses substantially the same path to arrive at the face of the vidicon tube any temperature or acceleration changes will affect the path of both stars in the pair in substantially the same fashion, thereby creating no error in the angle between them. Thus, the present device is relatively insensitive to temperature and acceleration changes. Also, since a single detecting means is utilized any changes in sensitivity or any of the optical or electronic components will affect all of the stars equally and therefore have no net effect on the angles between them. Another advantage in the present device is the fact that the initial alignment of the device is comparatively easy and the stars being tracked may be substituted with other stars by simply changing a single component and adjusting the computer, as will be explained later.

Accordingly it is an object of this invention to provide an improved control apparatus.

Another object of this invention is to provide an improved space velocity meter.

Another object of this invention is to provide a space velocity meter which is highly accurate.

These and other objects of the present invention will be understood upon consideration of the accompanying specification, claims and drawings of which:

FIGURE 5 is a pictorial view of the present invention utilizing three telescopes;

FIGURE 7 is a pictorial view of a reflecting prism showing the silvered portions.

Figure 1:
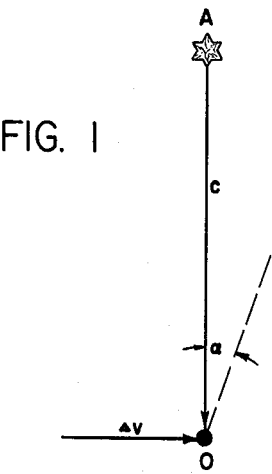
FIGURE 1 is a vectorial diagram depicting a star aberration.

In FIGURE 1 an observer situated at point O would see a star at position A when the observer was at rest or had some initial velocity. Assuming the observer had a velocity change of magnitude and direction equal to a vector $\Delta V$ when he was at point O the same star would appear to be at position A'. This apparent change in position of a star due to the observer's change of velocity is known as the aberration of starlight. The angle between the two positions, A the apparent position of the star at the time of the observer's initial velocity state, and A' the apparent position at the time when the observer has experienced some change in velocity, $\Delta V$, is identified as alpha ($\alpha$) in FIGURE 1. Angle alpha is equal to the change of velocity $\Delta V$ of the observer divided by the velocity of light C. The vector from the star at position A to the observer's position O is denoted C because this is the velocity of the light radiating from the star. It should be noted here that the angle alpha is directly proportional to the change of velocity $\Delta V$ of the observer at point O. That is, the greater the change of velocity $\Delta V$ of the observer the larger the angle alpha.

Figure 2:
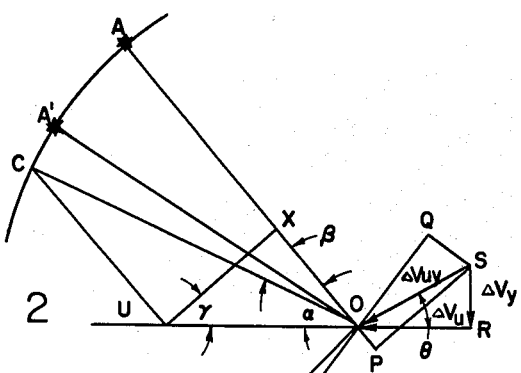
FIGURE 2 is a vectorial diagram depicting the relation of velocity to aberration due to two stars.

In FIGURE 2 position A and position B are the points at which an observer at position O at rest or having some initial velocity would see a pair of stars. $\Delta V_{uy}$ is the projection of some unknown change in the observer's initial velocity vector in the AOB plane. In this case the actual change of velocity would be $\Delta_v$, but since only that component of velocity normal to the line of sight to the star is effective in producing the star aberration observed, a projection of the unknown change in the initial velocity of the observer, denoted $\Delta V_{uy}$, must be used. Positions A' and B' are the positions to which the stars at A and B respectively appear to move when the observer at point O changes his velocity in the AOB plane an amount equal to $\Delta V_{uy}$. In FIGURE 2 the line PS is the component of $\Delta V_{uy}$ normal to line AO, and line QS is the component of $\Delta V_{uy}$ normal to the line BO. It should be noted in FIGURE 2 that the change in velocity $\Delta V_{uy}$ affects an apparent change in position of both stars. That is, PS is the component of velocity change $\Delta V_{uy}$ which causes the star at A to apparently shift to A' and line QS denotes the component of velocity change $\Delta V_{uy}$ which causes the star at B to apparently shift to position B'. The total angular shift between the stars originally positioned at A and B is denoted by angle AOC. FIGURE 2 is constructed so that the arc AA' is approximately equal to the line PS, the arc BB' is approximately equal to the line QS, and the arc A'C is approximately equal to the arc BB'. Thus, the arc AC is approximately equal to the line PS plus the line QS. The angle AOU denoted $\alpha$ is one half of the angle AOB. Also, line AO is equal to line OB is equal to C which is the finite velocity of light. The construction of FIGURE 2 is such that angle OPS equals angle ORS equals angle OQS equals 90°, and line CU is parallel to line AO. Angle $\beta$ is the observed angular change due to aberration of both stars at positions A and B. By using the foregoing facts and simple geometry and trigonometry, it can be proven that $$\Delta V_u = \frac{\beta C}{2 \sin \alpha}$$

The vector $\Delta V_u$ denotes the component of $\Delta V_{uy}$ which is directed along the bisector OU of angle AOB.

Figure 3:
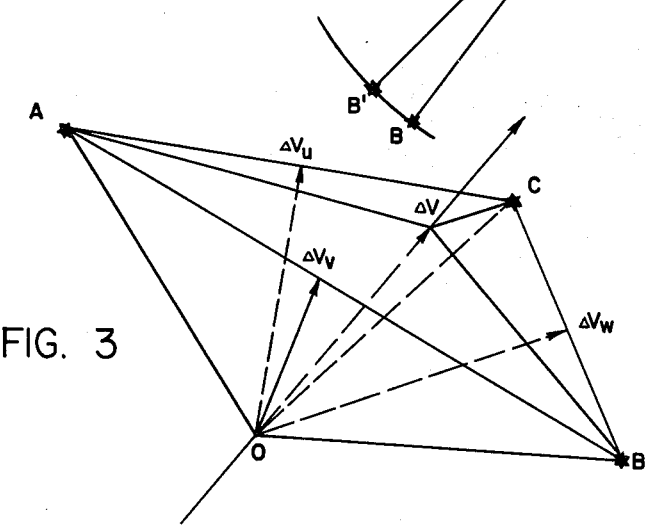
FIGURE 3 is a vectorial diagram depicting the relationship of projections of a change in velocity on three reference planes to the actual change of velocity.

As shown in FIGURE 3 a plurality of pairs of stars, AB, AC, and BC, may be utilized to find the projections on the three reference planes of the change of velocity of the observer in several directions. $\Delta V_v$ is shown as the projection of velocity change along the bisector of angle AOB. $\Delta V_u$ is shown as the projection of velocity change along the bisector of the angle AOC. $\Delta V_w$ is shown as the projection of velocity change along the bisector of angle BOC. Once $\Delta V_u$, $\Delta V_v$ and $\Delta V_w$ are found, $\Delta_v$, the change in velocity, may be found by computation in a digital computer. $\Delta V$ is the change in velocity of an observer at point O from a first time to a second time. This change in velocity $\Delta V$ can be computed by measuring the apparent change in angles AOB, AOC and BOC between the three stars, A, B and C from the first time to the second time.

The observer is considered to remain at a point O even though he is traveling at some undetermined speed for a given length of time between the first reading and the second reading. Even if the observer were traveling at a rate of several hundred miles per second, the distance he would travel in a short period of time, for example five minutes, would be infinitesimal compared to the distance to the stars he is using to measure aberrations. Thus, the observer may be considered to remain at point O with no resulting depreciation of pointing accuracy.

Figure 4:
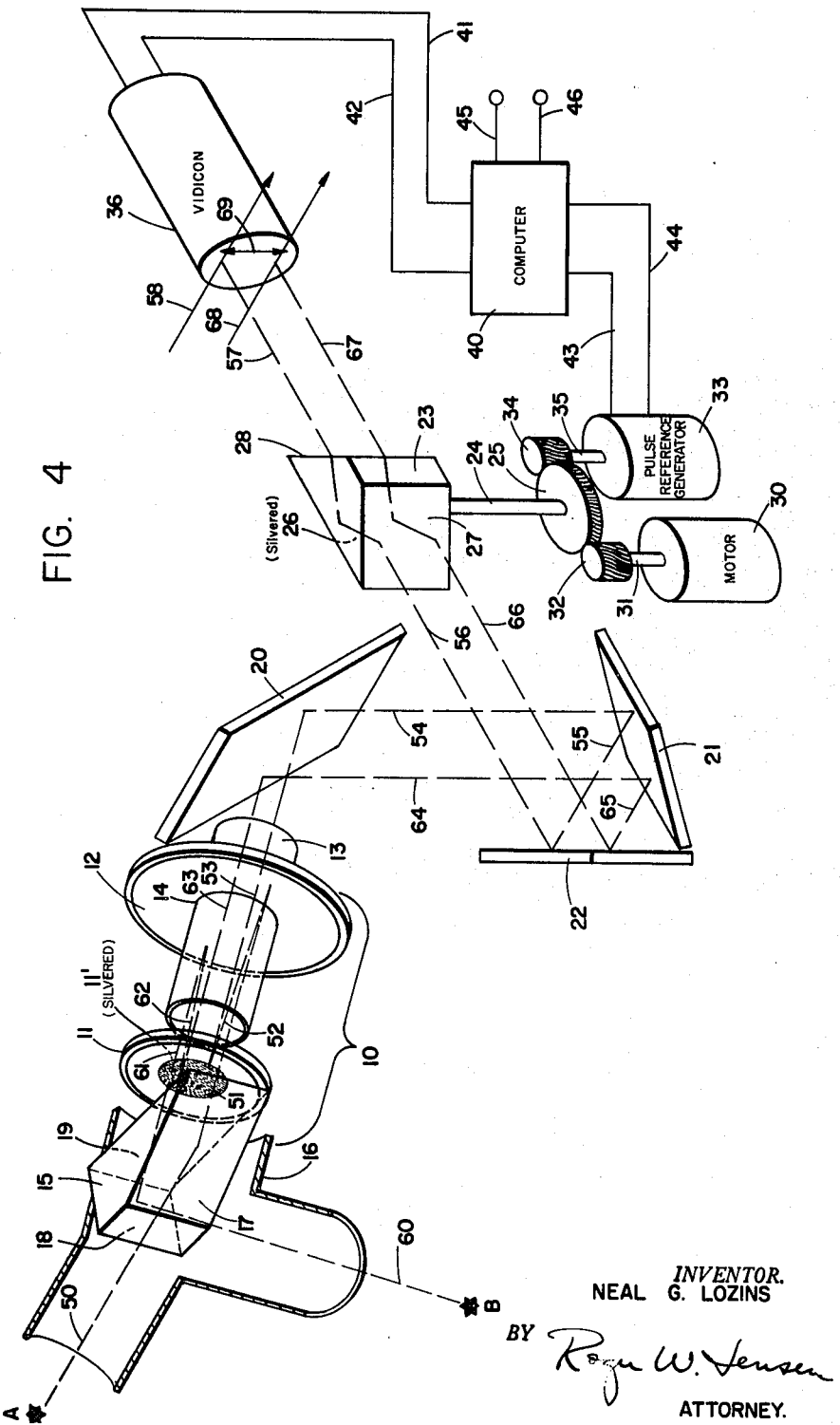
FIGURE 4 is a block diagram of the present invention utilizing a single telescope.

FIGURE 4 is a preferred embodiment of the present invention for accurately measuring the apparent change in angle between a pair of stars due to the velocity of the apparatus. A telescope designated numeral 10 is utilized to discern the desired stars. Telescope 10 is comprised of a meniscus lens 11, a primary spherical or aspherical mirror 12, a small secondary mirror 11' located on the back surface of the meniscus lens, and an opaque hollow cylinder 13 which is placed within an observation aperture 14 in spherical mirror 12, all mounted by means not shown, in a manner well known to those skilled in the art. In normal operation of the telescope, light enters through the meniscus lens 11 and is transmitted to the spherical mirror 12 which reflects it back to the secondary mirror 11' located on the back surface of meniscus lens 11. The cylinder 13 in the observation aperture 14 in spherical mirror 12 extends outwardly from the observation aperture 14 towards the meniscus lens 11 to prevent stray light from entering the observation aperture 14 directly from the meniscus lens 11. The light reflected to the meniscus lens 11 from the spherical mirror 12 is again reflected by the meniscus lens 11 through the cylinder 13. It should be understood that the lens system explained is simply a method of doubling the light back on itself to reduce the overall length of the telescope and, thus, save space. Any of the many varied forms of telescopes may be utilized. An amplifying lens may also be located in the optical train in order to provide the long back focal length required.

A reflecting prism 15 is placed in optical alignment with the meniscus lens 11 of telescope 10. The two stars which it is desired to discern are designated A and B. Star A forms some angle less than 90° in the clockwise direction with the central axis of the telescope 10. The star B forms some angle less than 90° in the counter- clockwise direction with the central axis of the telescope 10. For simplicity the stars A and B and the telescope should be oriented so that they all appear in the same plane. Reflecting prism 15 is so constructed that the light transmitted from star A is reflected into the meniscus lens 11 of telescope 10 approximately parallel with the central axis of the telescope. The light from star B is also reflected by reflecting prism 15 so that it enters the telescope approximately parallel to the telescope central axis. This is accomplished by constructing reflecting prism 15 as an isosceles triangular prism with two equal active sides 17 and 18 accepting light and a third active side 19 emitting light. In this apparatus prism 15 is truncated to reduce the overall size. Prism 15 is shown more clearly in FIGURE 7. Beginning where active sides 17 and 18 join active side 19 a portion of each of sides 17 and 18 is silvered to form a reflecting surface. These portions are numbered 17' and 18', respectively, in FIGURE 7. The other portion of each side forms a window to allow light to enter as depicted by the portions numbered 17" and 18" in FIGURE 7. The proportions of the prism windows can be made unequal to compensate for intensity differences between the stars of interest. However, it should be noted that the prism 15 need not be silvered in this fashion and it would still operate. The silvered sides, as is well known in the art, decrease the amount of light lost and limit the stray light admitted to the device. Light from star A will enter reflecting prism 15 through the window 18" in side 18 and be reflected from the silvered portion 17' of side 17 down through side 19 and into the meniscus lens 11. Light from star B will enter reflecting prism 15 through the window 17" in side 17 and be reflected from the silvered portion 18' of side 18 down through side 19 and into the meniscus lens 11. It should be noted here that if a pair of stars having a different angular relationship were chosen the reflecting prism would have to be changed. However, this is the only component which it is necessary to charge to observe different pairs of stars. The Y-shaped member 16 is a sun shade which may be composed of cylindrical portions of some convenient opaque material. Sun shade 16 is fitted over the end of telescope 10 and positioned so that the light from star A may be transmitted down one leg to the reflecting prism 15, and the light from star B may be transmitted down the other leg to reflecting prism 15. Sun shade 16 is provided to kep light other than the desired starlight from the telescope.

The transmitted images of stars A and B are reflected by a series of mirrors 20, 21 and 22 to a dove prism 23. Dove prism 23 is an isosceles prism having a pair of equal active sides 27 and 28 and a third or base active side 26. The base or unequal active side 26 is silvered for reflection from either the internal or the external direction, and the equal active sides 27 and 28 will either accept or emit light. The operation of this prism will be explained more fully later. Reflecting mirrors 20, 21 and 22 are preferably front surface reflecting mirrors and are mounted by some means not shown so that they direct the optical path through the dove prism 23. The series of mirrors 20, 21 and 22 are utilized simply so that dove prism 23 may be mounted horizontal to the apparatus platform and so that the telescope may point in a direction other than in the horizontal, and it should be noted that if the dove prism were mounted in some other position or stars A and B were in some other position the mirrors 20, 21 and 22 would not be necessary.

Dove prism 23 is connected to a gear 25 by means of a shaft 24. Dove prism 23, shaft 24 and gear 25 are rotatably mounted by some means not shown. A drive motor 30 is connected to a drive gear 32 by a shaft 31. Motor 30 is mounted by means not shown in a position so that drive gear 32 rotatably drives gear 25 and, thus, dove prism 23 through shaft 24. A pulse reference generator 33 is also connected to gear 25 by means of a gear 34 and a shaft 35, and mounted by means not shown. The rotatably mounted dove prism 23 sweeps the star images transmitted from telescope 10 across a detecting means which may be an image converter tube such as the vidicon tube 36 in FIGURE 4.

The vidicon tube 36 is electrically connected to a computer 40 by means of a lead 41 and a lead 42. Computer 40 is also connected to pulse reference generator 33 by means of a lead 43 and a lead 44. Computer 40 has a pair of output leads 45 and 46 which are adaptable to be connected to some control means or some indicating means.

In the operation of the present invention a beam of light is transmitted from star A along path 50 to reflecting prism 15. At reflecting prism 15 the beam of light enters the window 18" in side 18 and is deflected into the meniscus lens 11 along a path 51 by the silvered portion 17' of side 17. The spherical mirror 12 reflects the light from path 51 back to the meniscus lens 11 along path 52. A central obscuration, secondary mirror 11', on the meniscus lens 11 is silvered and reflects the light from path 52 along path 53 through the cylinder 13. As the star image is transmitted from the telescope through cylinder 13 along path 53 it is reflected in a series of steps 54, 55 and 56 to rotating dove prism 23 by means of mirrors 20, 21 and 22. In this phase of transmission the star image may be reflected through more or less steps depending upon the angle which it must be bent to impinge upon the rotating dove prism 23. Rotating dove prism 23 reflects the star image along a path 57 to the face of the vidicon tube 36. Since the dove prism 23 is rotating it sweeps the image along the face of the vidicon tube 36 along a path designated by line 58.

The light from star B is transmitted along a path 60 to reflecting prism 15 where it enters the prism through the window 17" in side 17 and is deflected downward by the silvered portion 18' of side 18 through the meniscus lens 11 to the spherical mirror 12 along a path 61. The spherical mirror 12 reflects the image of star B back to the underside of the meniscus lens 11 along a path 62. The silvered underside portion, secondary mirror 11', of the meniscus lens 11 reflects the star image through the cylinder 13 along a path 63. The transmitted image of star B is then reflected from path 63 along a series of steps 64, 65 and 66 to dove prism 23. The series of steps 64, 65 and 66 are accomplished by mirrors 20, 21 and 22 and the paths are substantially the same as for the image from star A. The dove prism 23 then reflects the image from path 66 along a path 67 to vidicon tube 36. Since the dove prism 23 is rotating the image from star B is swept across the face of the vidicon tube 36 along a path 68, which is parallel to path 58 but separated by a distance corresponding to one or two minutes of arc.

The vidicon tube 36, as is well known in the art, has a face with a conducting layer of metallic film deposited upon it so thin that it is transparent and a layer of photoconductive material is in turn deposited upon the back of the conductive layer. The photoconductive material is a semiconducting material which is characterized by a resistance that decreases upon exposure to light. Therefore, as the rotating dove prism 23 sweeps the light from the pair of stars across the face of the vidicon tube along paths 58 and 68 a charge pattern is set up. The electron gun of the vidicon tube 36 then sweeps the face of the tube from bottom to top, or top to bottom at a constant rate as shown by the double headed arrow 69 and each time the sweep crosses the lines 58 and 68 an electrical pulse is produced between output lines 41 and 42. The time interval between the pulses on lines 41 and 42 is proportional to the distance between the light lines 58 and 68 on the face of vidicon tube 36. The many scans that take place in each TV frame are averaged in the computer. Any changes in angle between stars A and B due to a change in the velocity of the apparatus at some subsequent time will produce a change in the average distance between the pulses on lines 42 and 41. Since the change in distance between the pulses on lines 41 and 42 is directly proportional to the change in velocity of the apparatus in the plane of interest, the computer 40 simply measures the distance between the pulses, averages them, and compares this reading to the calibration reading. This result together with the results derived from the other two telescopes are processed in the computer to solve for the change of velocity. This information is transmitted to other portions of the navigation system by means of lines 45 and 46.

It should be noted that the light from star A and the light from star B traverses substantially the same path throughout the apparatus. Thus, any change of one of the components due to temperature or acceleration will affect an equal variation in both paths thereby having no net effect. Also, a single detecting means is utilized to detect the images of both stars, therefore, any weakening of the detecting means due to factors such as age will effect both star images in the same amount. Another factor which greatly adds to the accuracy of the present invention is the utilization of a highly sensitive detecting means such as a vidicon or image orthicon tube. Thus, it can be seen that the present device is highly accurate and relatively insensitive to changes of temperature and acceleration.

FIGURE 5 is a pictorial view of the present invention. A spherically shaped, hollow housing 74 is composed of some opaque material to house the rotating dove prism 23 and some of the mirrors which direct the desired beams of light on to it, as well as to shield to device from stray light. Housing 74 has attached thereto, by some convenient means such as welding, a plurality of projections or arms which are in general hollow cylinders composed of the same material as the main housing 74. A projection 73 houses the vidicon tube 36, the operation of which has been previously explained. A first arm 70 contains a telescope such as telescope 10 described in conjunction with FIGURE 4, and two other arms 71 and 72 contain similar telescopes only the reflecting prisms of which can be seen. Arm 70 is terminated with prism 15, the operation of which has been explained previously, and arms 71 and 72 are terminated with a prism 75 and a prism 76 respectively. Each of the reflecting prisms 15, 75 and 76 at the ends of arms 70, 71 and 72 are similar except that the angle between the equal active sides is different to accommodate the pair of stars it is desired to discern. Prism 15 has sides 17 and 18 exposed to the stars, as previously explained. Prism 75 has a side 82 and a side 83 exposed to the pair of stars it is desired to have this telescope discern. Prism 76 has a side 84 and a side 85 exposed to the pair of stars it is desired to have this telescope discern. As previously explained in conjunction with FIGURE 3 side 17 of prism 15 and side 82 of prism 75 may be positioned to accept light from a single star. Also, side 83 of prism 75 and side 84 of prism 76 may accept light from a single star and side 18 of prism 15 and side 85 of prism 76 may accept light from a single star. In this fashion three stars may be utilized to obtain three projections on three reference planes of the change of velocity of the apparatus. The selection of the stars for optimum performance should be based upon minimum proper motion and parallax and the stars should be spaced approximately 109° in their relationship to each other as well as bright enough to permit tracking with optics of moderate size. An example of three such stars is Alnilam, Deneb and Spica. It should be noted that this device would be operable anywhere in the universe but since such things as the earth's atmosphere have great effect on the light from the stars it would not give correct readings in the atmosphere of the earth and certain planets. Sun shades such as shown and described in FIGURE 4 have not been included in this drawing for simplicity in picturing the relative positions of prisms 15, 75 and 76.

Figure 6:
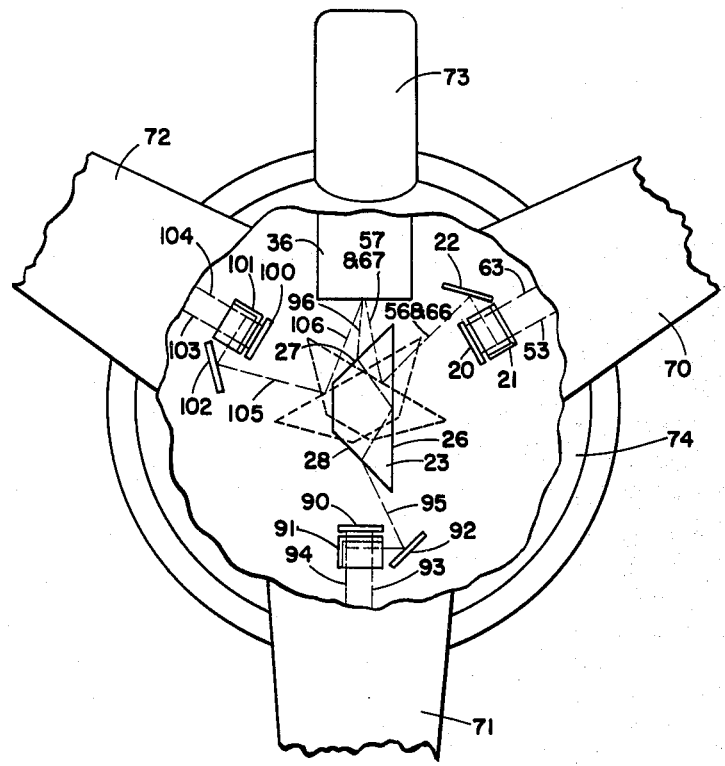
FIGURE 6 is a partial breakaway of FIGURE 5 showing the light paths from the telescopes through the dove prism to the vidicon tube.

FIGURE 6 is a partially cutaway view of FIGURE 5 showing the manner in which the dove prism 23 reflects the light from all three telescopes to one vidicon 36. As previously explained in FIGURE 4 the image of star A is transmitted by telescope 10 along path 53 to mirrors 20, 21 and 22 which reflect the image to the rotating dove prism 23 along path 56. The rotating dove prism then sweeps the image across the face of the vidicon tube 36 along a path 57 by reflection from side 26. In a similar manner the image of star B traverses paths 63, 66 and 67 to the vidicon tube 36. Both of these paths are shown and numbered in FIGURE 6. The images from a pair of stars discerned by the telescope in arm 71 are transmitted along paths 93 and 94 to a series of mirrors 90, 91 and 92 which reflect the images along a pair of paths designated by the single number 95. The star image enters side 28 of dove prism 23 and is bent onto reflecting side 26 where it is reflected out of side 27 and along path 96 to the face of the vidicon tube 36. If the dove prism 23 is rotating in a clockwise direction the images from the pair of stars discerned by the telescope in arm 71 will be swept across the face of the vidicon tube after the images from the stars picked up by the telescope in arm 70. A third telescope positioned in arm 72 will transmit images from a pair of stars along paths 103 and 104 to a reflecting series of mirrors 100, 101 and 102. This series of mirrors will reflect the star images along a pair of paths designated by the single numeral 105 to the rotating dove prism 23. As the rotating dove prism 23 rotates in the clockwise direction the reflecting side 26 reflects the star images from the path 105 along path 106 to the face of vidicon tube 36. The rotating dove prism 23 will sweep the pair of images across the vidicon tube face along a path parallel to the plane of the drawing. The star images from the telescope in arm 72 will be swept across the vidicon face after the star images from the telescope in arm 71. Thus, it can be seen that the single rotating dove prism 23 sweeps the images from the pair of stars of each of the three telescopes alternately across the face of the vidicon tube.

The pulse reference generator 33 in FIGURE 4 is geared to the rotating dove prism 23 and sends signals to the computer 40 by means of a pair of leads 43 and 44. These signals are indicative of which telescope the dove prism is optically aligned with, and they may be in the form of pulses or simply a set of brushes and slip rings. By means of these singals the computer can differentiate between the components of velocity $\Delta V_u$, $\Delta V_v$ and $\Delta V_w$, for example, the angle between the star images transmitted by the telescope in arm 70 may be indicative of $\Delta V_u$, the angle between the star images transmitted by the telescope in arm 71 may be indicative of $\Delta V_v$ and the angle between the star images transmitted by the telescope in arm 72 may be indicative of $\Delta V_w$. Thus the computer can measure separately the three projections of the change of velocity, and then combine them to get the change in the velocity. This change in velocity can then be vectorially added to the initial velocity to get the final velocity, and, if it is desired, a time-based integration program will give the change in position.

Thus it can be seen that a highly accurate space velocity meter which is relatively insensitive to temperature and acceleration changes has been disclosed. Also, it should be noted that since a single rotating dove prism and single vidicon tube is utilized the system will be relatively inexpensive and easy to construct.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. Apparatus of the class described comprising: an assembly of lenses and mirrors for discerning two stars simultaneously, the light from each of the stars traversing substantially the same components in said assembly, said assembly transmitting images of the two stars; an image converter tube for measuring the change in distance between the transmitted images as a measure of the apparent change in angle, due to aberration, between the two stars; and means for applying the two transmitted star images to said image converter tube.

2. Apparatus of the class described comprising: means for discerning two stars simultaneously, said means transmitting images of the two stars; a vidicon tube; means for applying the two transmitted star images to the face of said vidicon tube; computing means for determining the linear velocity change of said apparatus along a line bisecting the angle between the two stars from the change in distance between the star images on said vidicon tube; and means connecting said vidicon tube to said computing means.

3. Apparatus of the class described comprising: means for discerning two stars simultaneously, said means transmitting images of the two stars; an image converter tube; means for applying the two transmitted star images to the face of said image converter tube; computing means for determining the linear velocity change of said apparatus along a line bisecting the angle between the two stars from the change in distance between the star images on said image converter tube; and means connecting said image converter tube to said computing means.

4. Apparatus of the class described comprising: an assembly of lenses and mirrors for discerning two stars simultaneously, the light from each of the stars traversing substantially the same components in said asssembly, said assembly transmitting images of the two stars; detecting means for detecting the apparent change in angle due to aberration between the two stars; means for applying the two transmitted star images to said detecting means; computing means for determining the linear velocity change, along a line bisecting the angle between the two stars, of said apparatus from the change in distance between the star images on said detecting means; and means connecting said detecting means to said computing means.

5. Apparatus of the class described comprising: means for discerning a plurality of pairs of stars simultaneously; said means transmitting images of said plurality of pairs of stars; detecting means for detecting the apparent change in angle, due to aberration, between the stars in each of the pair of stars in said plurality; means for applying the transmitted images of said plurality to said detecting means; computing means for determining the velocity change of said apparatus in the universe from the change in the distance between the star images on said detecting means; and means connecting said detecting means to said computing means.

6. Apparatus of the class described comprising: a plurality of assemblies of lenses and mirrors, each assembly being capable of discerning a pair of stars simultaneously, the light from the first star of each pair of stars traversing substantially the same components in said assembles as the light from the second star, said assemblies transmitting images of the pairs of stars; detecting means for detecting the apparent change in angle, due to aberration, between the stars of each pair of stars; means for applying the transmitted images of the stars to said detecting means; computing means for determining the velocity change of said apparatus in the universe from the change in distance between the star images on said detecting means; and means connecting said detecting means to said computing means.

7. Apparatus of the class described comprising: means for discerning a plurality of pairs of stars simultaneously, said means transmitting images of said plurality of pairs of stars; a vidicon tube for detecting the apparent change in angle, due to aberration, between the stars in each of the pair of stars in said plurality; means for applying the transmitted images of said plurality to said vidicon tube; computing means for determining the velocity change of said apparatus in the universe from the change in the distance between the star images on said vidicon tube; and means connecting said vidicon tube to said computing means.

8. Apparatus of the class described comprising: means for discerning a plurality of pairs of stars simultaneously, said means transmitting images of said plurality of pairs of stars; an image converter tube for detecting the apparent change in angle, due to aberration, between the stars in each of the pair of stars in said plurality; means for applying the transmitted images of said plurality to said image converter tube; computing means for determining the velocity change of said apparatus in the universe from the change in the distance between the star images on said image converter tube; and means connecting said image converter tube to said computing means.

9. Apparatus of the class described comprising: means for discerning a plurality of pairs of stars simultaneously, said means transmitting images of said plurality of pairs of stars; a vidicon tube for detecting the change in distance between the star images as a measure of the apparent change in angle, due to aberration, between the stars in each of the pair of stars in said plurality; and means for applying the transmitted images of said plurality to said vidicon tube.

10. Apparatus of the class described comprising: means for discerning two stars simultaneously, said means transmitting images of the two stars; an image converter tube; means for sweeping the two transmitted star images across the face of said image converter tube substantially perpendicular to the scan of said image converter tube, said image converter tube producing a pair of output pulses each time the scan crosses the two transmitted star images at the face of said tube; computing means for determining the velocity change of said apparatus along a line bisecting the angle between the two stars from the average change in distance between the star images on the face of said image converter tube, said change of distance being indicative of a change in the apparent angle between said star images; and means connecting said image converter tube to said computing means.

References Cited by the Examiner
UNITED STATES PATENTS

| | | | |
|---|---|---|---|
| 2,439,295 | 4/1948 | Hammond et al. | 88—1 |
| 2,581,589 | 1/1952 | Herbst | 88—1 |
| 2,930,545 | 3/1960 | Houle et al. | 250—203 X |
| 2,954,608 | 10/1960 | Lawlor | 250—203 X |
| 3,001,289 | 9/1961 | Carbonara | 250—203 X |
| 3,037,121 | 5/1962 | Collison | 250—203 |
| 3,039,002 | 6/1962 | Guerth | 250—203 |
| 3,048,352 | 8/1962 | Hansen | 250—203 X |
| 3,080,485 | 3/1963 | Saxton | 250—203 |
| 3,110,812 | 11/1963 | Hulett et al. | 250—203 |
| 3,120,578 | 2/1964 | Potter et al. | 250—203 X |
| 3,136,208 | 6/1964 | Magson. | |

RALPH G. NILSON, *Primary Examiner.*